Patented June 24, 1947

2,422,724

UNITED STATES PATENT OFFICE 2,422,724

SUBSTITUTED 1,3,5-TRIAZINYL-(6)-AMINO-PHENYL-ARSENIC COMPOUNDS

Ernst A. H. Friedheim, New York, N. Y.

No Drawing. Application January 20, 1944,
Serial No. 518,998

7 Claims. (Cl. 260—242)

This invention relates to derivatives of triazines containing arsenic, and more particularly to triazine derivatives which contain trivalent arsenic.

In my U. S. Patent 2,295,574, issued on September 15, 1942, I have shown that condensation of suitable derivatives of symmetric triazine with phenyl-arsonic acid derivatives results in a new type of condensation products possessing valuable therapeutic properties in diseases caused by spirochaetes or trypanosomes, such as syphilis, and African sleeping sickness.

I have found that new triazine derivatives containing arsenic can be obtained by condensing derivatives of 1,3,5-triazine of the formula

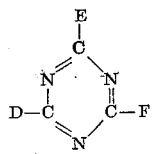

with an aromatic organic compound containing trivalent arsenic and corresponding to the formula W—$C_6H_2$(A,B)—AsX.

In these formulas, W is an amino-group or halogen. If W is an amino-group, at least one of the groups D, E, F is a halogen-group. If W is a halogen, at least one of the groups D, E, F is an amino-group. In both cases the other groups are selected from the group consisting of halogen, $NH_2$, NH Alk., N Alk.$_2$, hydroxy-alkyl-amino, $NHCH_2CHOHCH_2OH$, dialkyl-amino-alkyl-amino, and aminoacyl radicals, such as $NHCOCH_3$ and $NHCOC_6H_5$; the radicals A and B are selected from the group consisting of hydrogen, halogen, OH, O Alk., O acyl, $NO_2$, $NH_2$, NH Alk., N Alk.$_2$, aminoacyl, and alkyl radicals; X is a divalent group selected from the group consisting of O, S, dihalides, such as $Cl_2$, $I_2$ or $Br_2$, and sulfur-containing radicals of the type (S—R)$_2$ wherein R is an organic radical which is capable of carrying an SH-radical. Such sulfur-containing reactants are, for example, thioglycollic acid, cysteine, or glutathione, thiophenol, thioacetic acid, thiobenzoic acid, thioacetamide, thiosalicylic acid, p-sulfhydril-benzene sulfonic acid, thiopropionic acid, p-sulfhydril-phenyl-acetic acid. As examples of the trivalent arsenic compounds to be used according to my invention, the following may be mentioned: 4-amino-phenylarsinoxide, 4-chlor-phenylarsinoxide, 4-amino-phenylarsindichloride, 4-amino-phenyl-arsinsulfide, 3-amino-4-oxy-phenylarsinoxide.

The condensation products thus formed have the formula

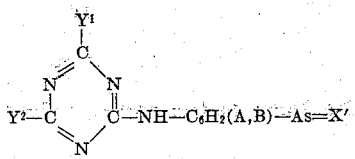

wherein $Y^1$ and $Y^2$ are each a radical selected from the group consisting of halogen, $NH_2$, NH Alk., N Alk.$_2$, hydroxy-alkyl-amino,

dialkyl-amino-alkyl-amino, and amino-acyl radicals; A and B are selected from the group consisting of hydrogen, halogen, OH, O Alk., O acyl, $NO_2$, $NH_2$, NH Alk., N Alk.$_2$, amino-acyl, and alkyl radicals, and X' is a divalent radical selected from the group consisting of O, S, dihalides, sulfur-containing groups of the type (S—R)$_2$, wherein R is an organic radical which is capable of carrying a SH-radical, and groups having the formula

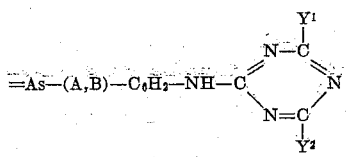

In carrying out the present invention, for example an aqueous solution containing one mol of 4-oxy-3-amino-phenylarsinoxide may be caused to react with a fine suspension of 1 mol of 2,4,6-trichloro-1,3,5-triazine in water at a temperature of 0° C. with the exclusion of oxygen. The resulting condensation product has the formula

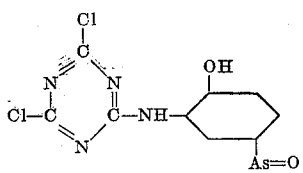

Subsequently, this reaction product may be treated with a base selected from the group consisting of ammonia, alkyl amines, hydroxy-alkyl amines and dialkyl-amino-alkyl amines. Similar reactions may be obtained by using a dihalide such as 4-amino-phenylarsindichloride instead of 4-oxy-3-amino-phenylarsinoxide. Instead of the latter, its derivatives or isomers, such as, for instance, 2-oxy-4-amino-phenyl-arsinoxide, or 4- amino-3-oxy-phenylarsinoxide may also be used. In carrying out these reactions, instead of the trichloro-triazine other derivatives of 1,3,5-triazine corresponding to the formula referred to above may also be used.

I have further found that the condensation products according to this invention may also be obtained by first forming a condensation product of the type disclosed in my above mentioned U. S. Patent No. 2,295,574 from a derivative of 1,3,5-triazine and a substituted phenyl-arsonic acid, and converting the condensation product thus obtained, into a compound containing trivalent arsenic. I have found that such conversion can be performed without the disintegration of the basic triazinyl-aminobenzene structure by treating the triazinyl-aminobenzene-arsonic acid condensation product in hydrochloric acid solution, in the presence of hydriodic acid, with $SO_2$, hypophosphorous acid ($H_2PO_3$), or stannous chloride, or in neutral or alkaline solution with phenyl-hydrazine or sodium hydrosulfite ($Na_2S_2O_4$). The reduction with $SO_2$ or phenylhydrazine leads to the arsinoxides or dihalogenarsines, while the treatment with stannous chloride, hypophosphorous acid, and sodium hydrosulfite leads to the corresponding arseno-compounds.

For example, one part by weight of 2,4-diamino-1,3,5-triazinyl-(6)-[amino-3-oxy-4-phenylarsonic acid I] is dissolved at about 80° C. in 100 parts of hydrochloric acid of sp. gr. 1.19. To the clear, warm solution 1/50 part of sodium iodide is added, and a stream of $SO_2$ gas is allowed to pass through the solution. After a few minutes the solution becomes cloudy, and the hydrochloride of 2,4-diamino-1,3,5-triazinyl-(6)-oxyaminophenylarsindichloride separates out in crystalline form. It is soluble in ethyl alcohol from which it may be recrystallized. It is slightly soluble in acetone, and insoluble in chloroform, $CCl_4$ and benzene. The corresponding arsinoxide is formed by the action of alkali, such as dilute ammonia or sodium bicarbonate on the arsindichloride.

An arseno-compound can be obtained by the action of stannous chloride on 2,4-diamino-triazinyl-(6)-[4-oxy-3-amino-phenylarsonic acid I]. One part of the latter is suspended in 50 parts of aqueous hydrochloric acid of 1.19 density containing about 50% stannous chloride, and 1% of hydriodic acid. On gentle warming the substance goes slowly into solution, the reaction mixture taking a yellow color. It becomes cloudy, and on standing a yellow precipitate separates, which represents the hydrochloride of the bis [2,2'-4,4'-tetraamino-triazinyl-(6-6')-(3-3'-diamino-4-4' dioxyarseno-benzene) of the formula:

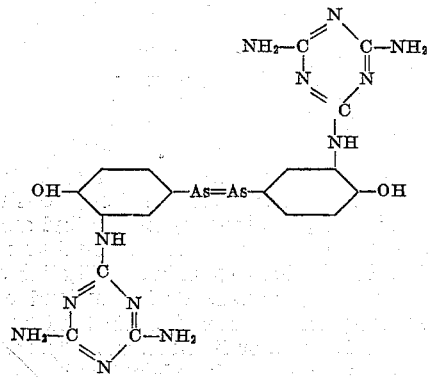

This compound is moderately soluble in dilute hydrochloric acid and insoulble in ether and chloroform.

Other compounds according to my present invention may be obtained by applying the above described reduction processes to other arseno-anilino-triazine compounds, such as monochlor-monoamino-arsono-anilino-triazine, and other arsono-anilino-triazine compounds obtained according to my above mentioned U. S. Patent No. 2,295,574.

As described in Example 2 of my U. S. Patent 2,295,574 p-[2,4-dichloro-1,3,5-triazinyl-(6)]-aminophenyl-arsonic acid may be treated with ammonia in order to convert it into a 2-chloro-4-amino-compound by covering said dichloro-compound with 10 times the quantity of 10% aqueous ammonia, and shaking at 45° C. for 1 hour, whereby the product goes into complete solution. By heating the [2-chloro-4-amino-1,3,5-triazinyl (6)]-aminophenylarsonic compound in hydrochloric acid solution with $SO_2$, a compound having the formula:

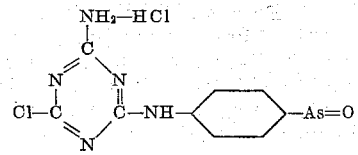

may be obtained.

Compounds corresponding to the general formula

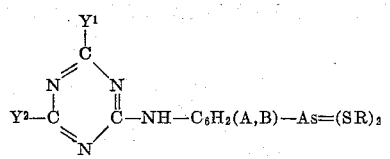

may be prepared by condensing a substituted phenyl-thioarsinite with a suitable triazine derivative, for example an aminophenylthioarsinite and cyanuric chloride or by reacting a compound of the formula HSR with a suitable triazine derivative carrying an aminophenyl radical containing arsenic. One mol of a triazine derivative carrying an aminophenylarsonic acid group may be reacted with 4 mols of the HSR-type compound, the latter causing first a reduction of the pentavalent arsenic radical to a trivalent arsenic radical and then combining in situ with the trivalent arsenic to a compound containing an —As=(SR)₂ type radical. Or a triazine derivative containing an aminophenyl—As⟨ type radical, such as aminophenyl—As=O or —As=Cl₂ may be prepared in a first step, and then condensed with 2 mols of HSR-type compound in a second step. The reaction may be carried out in aqueous solution or in the presence of an organic solvent.

In order to react p-(2,4-diamino-triazinyl-(6)-[4-oxy-3-amino-phenylarsinoxide] with glutathione, 5 g. glutathione are dissolved in 40 cc. of water and 3.5 g. of said arsinoxide are added. On slight further dilution and stirring for 24 hours in a non-oxidizing atmosphere, a clear solution is obtained, and evaporated over sulfuric acid. From the concentrated solution, a reaction product is separated by the addition of ethyl alcohol and drying at low temperature. This reaction product has the formula:

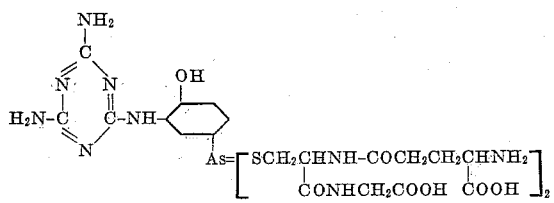

The compound thus obtained is soluble in aqueous solutions of sodium hydroxide or sodium carbonate and sparingly soluble in an excess of dilute mineral acid. It can be precipitated from alkaline solutions by acidifying said solutions.

Cystein hydrochloride may be reacted with p-(2,4 - diamino - triazinyl - (6) - [4 - oxy-3-aminophenylarsinoxide] according to the following scheme:

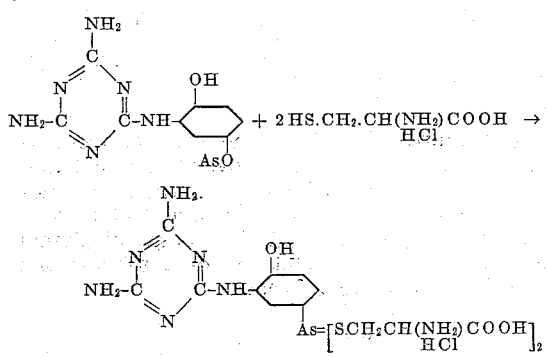

In order to carry out this reaction, the above named phenylarsinoxide (4.0 g.) was added to an aqueous solution of 3.0 g. cysteine hydrochloride in 50 g. of water. On moderate warming and stirring, a clear solution is obtained. To the solution sodium carbonate is then added until it is neutral to Congo paper. The neutral solution is mixed with 50 cc. of absolute alcohol and cooled to about 2°-3° C. for a few hours to separate the condensation product from the solution. The solid substance is separated from the liquid by filtration and washed with 50% aqueous ethyl-alcohol. It is insoluble in ether, chloroform and acetone, and soluble in aqueous sodium carbonate solution.

The above reaction between cysteine hydrochloride and p-(2,4-diamino-triazinyl-(6))-[4-oxy-3-amino-phenylarsinoxide] may also be carried out by reacting in an alcoholic reaction medium under stirring a mixture of cysteine hydrochloride, water, NaHCO3 and said phenylarsinoxide or by heating said reaction mixture to boiling temperature for a few minutes until a clear solution is obtained, and then making the solution slightly acid to Congo paper. The reaction product is soluble in aqueous solutions of NaHCO3, Na2CO3, or NaOH.

A water-soluble compound of the formula

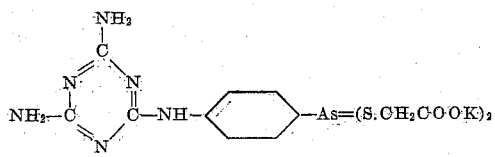

may be obtained by reacting p-[2,4-dimethylamino-1,3,5-triazinyl-(6)]-aminophenyl-arsindichloride with potassium thioglycolate. In order to obtain this compound, 3.5 g. of said arsindichloride is added to an aqueous solution containing 3.5 g. of potassium thioglycolate and the mixture is moderately heated, and then mixed with NaHCO3 to neutralize the hydrochloric acid formed. A similar compound may be obtained from potassium thioglycolate and p[2,4-diamino-1,3,5 - triazinyl - (6)] - 4 - oxy - 3 - amino-phenyl-arsindichloride.

If in the above reaction the sodium salt of thiosalicylic acid is used instead of potassium thioglycolate in a substantially similar manner, a water-soluble compound of the formula

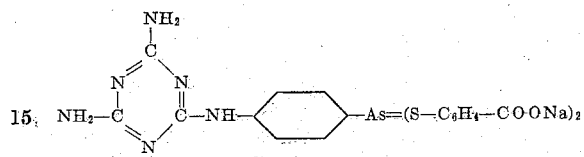

is obtained.

In reacting 1,3,5-triazinyl-aminophenyl-arsonic acid compounds with compounds carrying the —SH group, 1 mol of the arsonic acid compound requires the use of 4 mols of the mercapto compound. For example, 4 mols of thioglycollic acid are dissolved in a 10% aqueous NaOH-solution and reacted with one mol of [2,4-dimethyl-amino-1,3,5-triazinyl-(6)]-3-amino- 4 -hydroxy-phenyl-arsonic acid, and the reaction product is precipitated by acidifying the solution. Or 1/10 mol of said arsonic acid is added to an aqueous solution containing ½ mol of cysteine hydrochloride and heated to 80°-90° C. After the reaction, the solution is neutralized with NaHCO3.

A condensation product of p-sulfhydril benzene sulfonic acid and 2,4-amino-1,3,5-triazinyl-(6)-aminophenyl arsinoxide may be obtained by dissolving said benzene sulfonic acid in ethyl alcohol and reacting the alcoholic solution under stirring with an alcoholic suspension of said arsinoxide. The reaction takes place according to the following scheme:

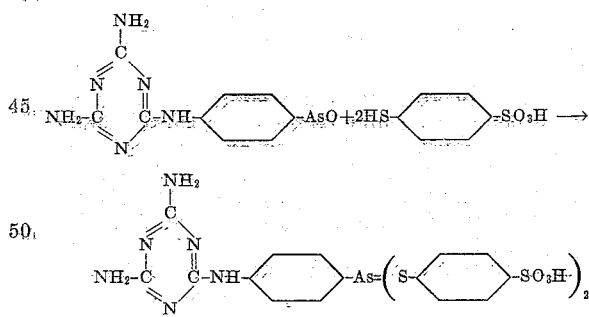

This condensation product is scarcely soluble in water, but easily soluble in aqueous solutions of NaHCO3 and Na2CO3.

If in the above procedure p-sulfhydril benzene sulfonic acid is substituted by p-sulfhydril-phenylacetic acid, a condensation product corresponding to the formula

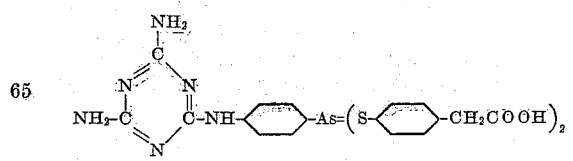

is obtained. The product is soluble in aqueous alkali and can be precipitated from its alkaline solution by the addition of acetic acid.

An alcoholic solution containing ½ mol of thiopropionic acid (HS—CH2—CH2—COOH) may be reacted under stirring with an alcoholic suspension of 1/10 mol of 2-amino-4-dimethyl-amino- 1,3,5-triazinyl-(6)-aminophenylarsonic acid to form a compound of the formula

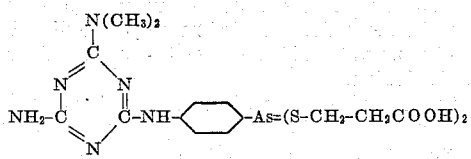

This compound can be dissolved in aqueous solutions of Na$_2$CO$_3$ or NaOH and precipitated by means of acetic acid from such solutions.

By reacting a 2% aqueous solution containing ½ mol of α-thiolacetamide with $\tfrac{1}{10}$ mol of 2-chloro-4-amino-1,3,5-triazinyl-(6)-amino-phenylarsonic acid added to said solution in a finely divided state under stirring a reaction product is formed, which corresponds to the formula

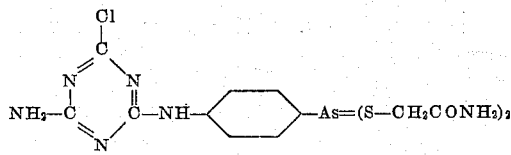

The reaction product can be dissolved in an excess of strong aqueous sodium hydroxide.

An aqueous alkaline solution containing $\tfrac{1}{10}$ mol of 2,4-diamino-1,3,5-triazinyl-(6)-[amino-3-oxy-4-phenylarsinoxide] prepared in the above described manner by reduction of the corresponding arsonic acid compound with SO$_2$ gas and treatment of the arsindichloride formed with sodium bicarbonate, may be reacted with $\tfrac{3}{10}$ mol of thiophenol under stirring for about 24 hours in order to form a compound corresponding to the formula

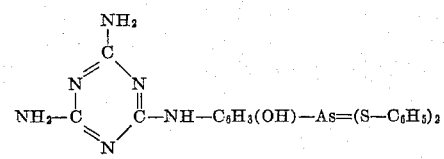

Instead of thiophenol an equivalent amount of α-thionaphthol may be used in a substantially similar manner. By treating an aqueous solution of the condensation products with a mild oxidizing agent, such as H$_2$O$_2$, the corresponding triazinyl arsonic acids and symmetrical disulfides are formed.

A compound corresponding to the formula

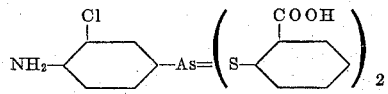

may be prepared by condensing 1 mol of 3-chloro-4-amino-phenylarsinoxide and 2¼ mols of o-thiol-benzoic acid in alcoholic solution under stirring for 18–24 hours in a non-oxidizing atmosphere. The compound thus obtained may be reacted with a fine suspension of one mol of cyanuric chloride in water at a temperature of 0° C. with the exclusion of oxygen. In this reaction an alkali soluble triazine derivative corresponding to the following formula is formed:

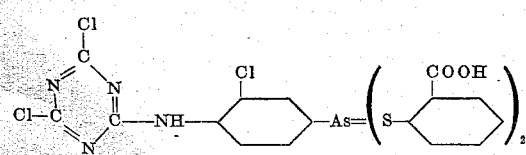

In the above reaction 4-amino-3-methyl-phenylarsinoxide may be used in a substantially similar manner in order to form a compound of the formula

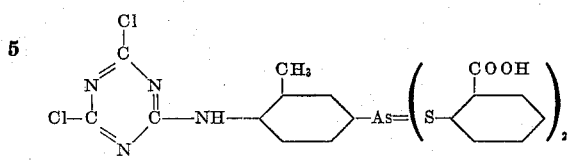

Condensation of 4-amino-3-acetamino-phenylarsonic acid with cyanuric chloride and reaction of the condensation product thus formed with an excess of thiophenol in aqueous alkaline solution results in a water-insoluble compound corresponding to the formula

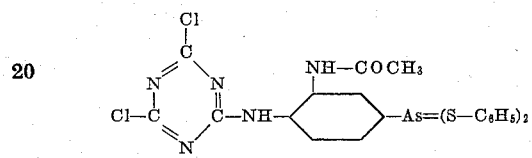

By forming a condensation product from 2-chloro-4-dimethylamino-phenylarsonic acid and triamino-triazine (melamine) in the above described manner, and reacting one mol of said condensation product with 5 mols of thiophenol in aqueous alkaline solution under stirring the following compound is formed

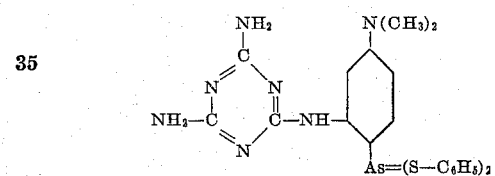

This compound is insoluble in water and scarcely soluble in an excess of dilute hydrochloric acid.

A condensation product of 4-amino-3-methoxyphenylarsonic acid and cyanuric chloride may be obtained by reacting one mol of said arsonic acid with an aqueous suspension of 1 mol of cyanuric chloride at 0° C. By reducing the condensation product in hydrochloric acid solution with SO$_2$ gas and reacting the arsindichloride formed by such reduction with 2 mols of potassium thioglycolate a water-soluble compound corresponding to the formula

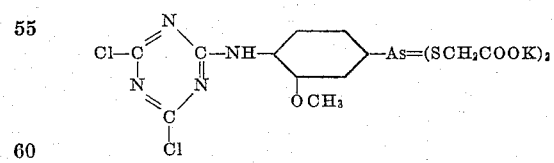

is formed.

The above described sulfur-containing condensation products are scarcely soluble or insoluble in alcohol, ether, chloroform and acetone. In alkaline solution they decolorize methylene blue, and they reduce ammoniacal silver solution. They have no definite melting point and are decomposed by heating.

A triazinyl-aminophenyl-arsenic compound carrying a mercapto-quinoline radical may be obtained by reacting 1 mol of 2,4 diamino-triazinyl-(6)-aminophenyl-arsinoxide with 2 mols of 2-mercapto-quinoline in aqueous solution in the presence of a neutralizing agent. The reaction takes place according to the following scheme:

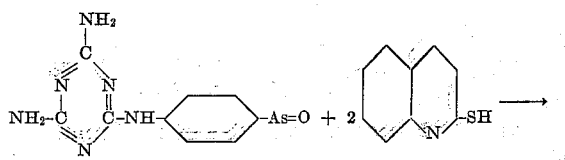

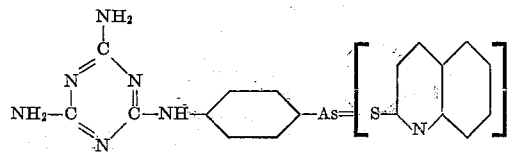

An equivalent amount of 6-bromo-2-mercapto-quinoline may be used in a substantially similar manner instead of 2-mercapto-quinoline in the above reaction.

Another mercapto-quinoline derivative embodying the present invention may be obtained by dissolving $\frac{3}{10}$ mol of 8-mercapto-quinoline in ethyl alcohol and reacting this solution with $\frac{1}{10}$ mol of 2,4-diamino-triazinyl-(6)-aminophenyl-arsinoxide for 24 hours. The resulting compound has the formula

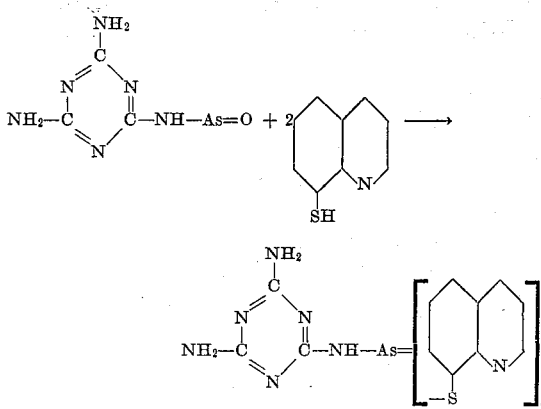

A similar reaction may be carried out in alcoholic reaction medium by using instead of 8-mercapto-quinoline an equivalent amount of 2-mercapto-4-methylquinoline, 2-mercapto-6-methylquinoline or 2-mercapto-pyridine.

I have also found that by reacting, 2,4 diaminotriazinyl-(6)-aminophenyl-arsinoxide with an alcoholic solution of β-phthalimido-ethylmercaptan a reaction product corresponding to the following formula is obtained:

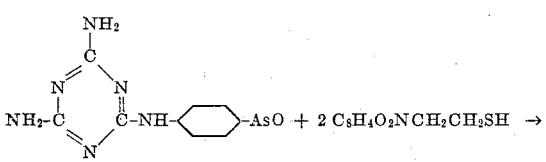

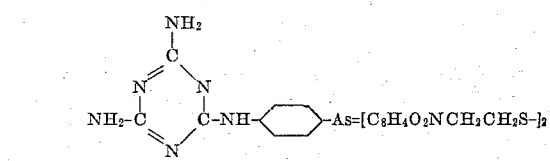

2-mercapto-pyridine and 4-mercapto-2,6-dimethyl-pyridine may also be reacted with the above aminophenyl-arsinoxide in an alcoholic reaction medium under stirring and moderate warming, yielding products corresponding to the formula

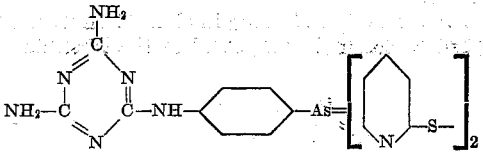

and

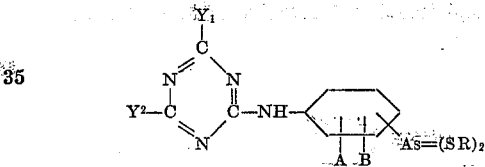

respectively.

It is to be understood that in the appended claims the term "amino radical" is used to include —NH₂-radicals as well as the above described substituted amino-radicals and the term "hydroxyl" radical is used to include —OH radicals as well as the here disclosed substituted —OH radicals.

Reference is made to my co-pending application Serial No. 422,234, filed December 9, 1941, now U. S. Patent No. 2,386,204, issued October 9, 1945, of which this is a continuation-in-part.

I claim:

1. A 1,3,5-triazine derivative of the formula

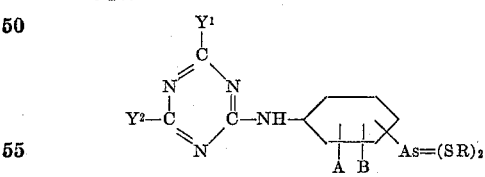

wherein $Y^1$ and $Y^2$ are each a radical selected from the group consisting of halogen and amino radicals; A and B are selected from the group consisting of hydrogen, halogen, hydroxyl, alkyl, and amino radicals, and —SR is selected from the group of organic sulfhydril radicals consisting of aliphatic, aromatic, pyridine and quinoline sulfhydril radicals.

2. A method of preparing a triazinyl derivative of the formula

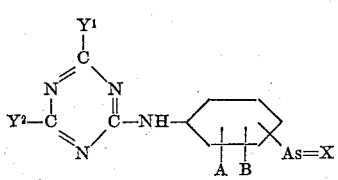

wherein $Y^1$ and $Y^2$ are each a radical selected from the group consisting of halogen and amino-radicals; A and B are selected from the group consisting of hydrogen, halogen, hydroxyl, alkyl, and amino-radicals, and —SR is an organic sulfhydril radical, said method comprising the step of reacting in a liquid reaction medium a triazinyl derivative corresponding to the formula wherein —As=X is a radical selected from the group consisting of —AsO₃H₂, —As=O and —As =dihalide, with an organic sulfhydril compound selected from the group consisting of aliphatic, aromatic, pyridine and quinoline sulfhydril compounds.

3. A method as claimed in claim 2, in which one mol of a triazinyl-compound of the formula

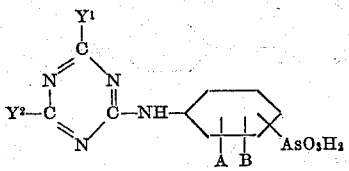

is reacted with at least 4 mols of the organic sulfhydril compound selected from the group consisting of aliphatic, aromatic, pyridine, quinoline sulfhydril compounds.

4. A method as claimed in claim 2, in which one mol of a triazinyl compound of the formula

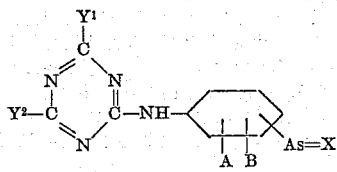

wherein X stands for a radical selected from the group consisting of O and dihalides, is reacted with at least two mols of an organic sulfhydril compound selected from the group consisting of aliphatic, aromatic, pyridine, quinoline sulfhydril compounds.

5. A 1,3,5-triazine derivative of the formula

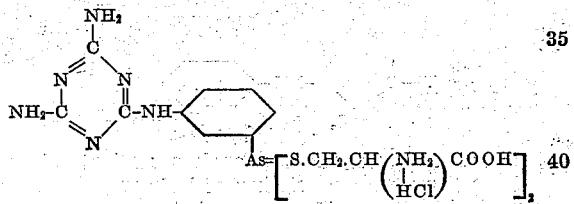

6. A 1,3,5-triazine derivative of the formula

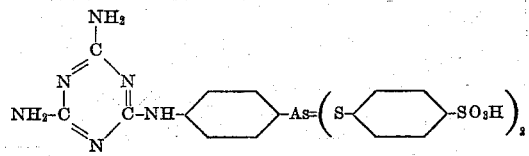

7. A 1,3,5-triazine derivative of the formula

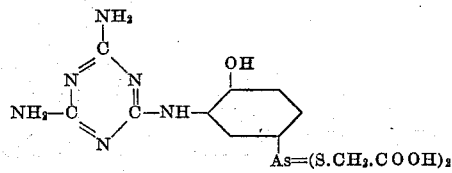

ERNST A. H. FRIEDHEIM.

REFERENCES CITED

The following references are of record in the file of this patent:

UNITED STATES PATENTS

| Number | Name | Date |
|---|---|---|
| 2,295,574 | Friedheim | Sept. 12, 1942 |
| 2,202,733 | Hamilton | May 28, 1940 |

FOREIGN PATENTS

| Number | Country | Date |
|---|---|---|
| 331,869 | Great Britain | 1928 |